United States Patent
Wang et al.

(10) Patent No.: US 11,378,399 B2
(45) Date of Patent: Jul. 5, 2022

(54) HIGH-PERFORMANCE INERTIAL MEASUREMENTS USING A REDUNDANT ARRAY OF INEXPENSIVE INERTIAL SENSORS

(71) Applicant: THE REGENTS OF THE UNIVERSITY OF MICHIGAN, Ann Arbor, MI (US)

(72) Inventors: John Wang, Ann Arbor, MI (US); Edwin Olson, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 405 days.

(21) Appl. No.: 15/760,033

(22) PCT Filed: Sep. 14, 2016

(86) PCT No.: PCT/US2016/051732
§ 371 (c)(1),
(2) Date: Mar. 14, 2018

(87) PCT Pub. No.: WO2017/048839
PCT Pub. Date: Mar. 23, 2017

(65) Prior Publication Data
US 2018/0266824 A1    Sep. 20, 2018

Related U.S. Application Data

(60) Provisional application No. 62/218,153, filed on Sep. 14, 2015.

(51) Int. Cl.
*G01C 19/5776* (2012.01)
*G01C 21/16* (2006.01)
(Continued)

(52) U.S. Cl.
CPC ......... *G01C 19/5776* (2013.01); *G01C 19/00* (2013.01); *G01C 19/58* (2013.01); *G01C 21/005* (2013.01); *G01C 21/16* (2013.01)

(58) Field of Classification Search
CPC .... G01C 19/5776; G01C 21/16; G01C 19/00; G01C 21/005
See application file for complete search history.

(56) References Cited

U.S. PATENT DOCUMENTS 6,882,964 B2   4/2005   Bayard et al.
8,200,436 B2   6/2012   Sato et al.
(Continued)

FOREIGN PATENT DOCUMENTS

CN   102334086 A   1/2012
CN   102682765 A   9/2012
(Continued)

OTHER PUBLICATIONS

Ramon van Handel, "Hidden Markov Models", Lecture Notes, Jul. 28, 2008.*

(Continued)

*Primary Examiner* — Alexander Satanovsky
(74) *Attorney, Agent, or Firm* — Harness, Dickey & Pierce, P.L.C.

(57) ABSTRACT

A method for determining the rotational rate of a movable member using an array of inertial sensors is provided. The method includes defining a hidden Markov model ("HMM"). The HMM represents a discrete value measurement of the rotational rate of the movable member. A transition probability of the HMM accounts for a motion model (linear or non-linear) of the movable member. An observation probability of the HMM accounts for noise and bias of at least one of the inertial sensors of the array of inertial sensors. A processor receives input from the array of (Continued)

inertial sensors. The processor determines the rotational rate of the movable member by solving for an output of the HMM using the input received from the array of inertial sensors. The processor may use a forward algorithm, a forward-backward algorithm, or a Viterbi algorithm to solve the HMM.

8 Claims, 8 Drawing Sheets

(51) Int. Cl.
   *G01C 19/00*   (2013.01)
   *G01C 21/00*   (2006.01)
   *G01C 19/58*   (2006.01)

(56) References Cited

U.S. PATENT DOCUMENTS

| | | | |
|---|---|---|---|
| 8,498,827 B2 | 7/2013 | Yost | |
| 2005/0071223 A1* | 3/2005 | Jain | G06Q 30/02 |
| | | | 705/14.13 |
| 2005/0229705 A1 | 10/2005 | Geen | |
| 2009/0135009 A1* | 5/2009 | Little | G06Q 10/00 |
| | | | 340/540 |
| 2010/0121601 A1 | 5/2010 | Eckert | |
| 2011/0313650 A1 | 12/2011 | Tome | |
| 2012/0300587 A1* | 11/2012 | Azimi-Sadjadi | G01S 11/14 |
| | | | 367/127 |
| 2013/0225294 A1 | 8/2013 | Qaisar | |
| 2013/0311129 A1* | 11/2013 | Yost | G01C 19/5776 |
| | | | 702/141 |
| 2015/0242036 A1* | 8/2015 | Heidari | G06F 1/1684 |
| | | | 345/173 |

FOREIGN PATENT DOCUMENTS

| | | |
|---|---|---|
| CN | 103162678 A | 6/2013 |
| CN | 106342175 B | 11/2013 |
| CN | 104034329 A | 9/2014 |
| CN | 104510475 A | 4/2015 |

OTHER PUBLICATIONS

Chengyu, et al "Signal Processing of MEMS Gyroscope Arrays to Improve Accuracy Using a 1st Order Markov for Rate Signal Modeling" Sensors 2012, vol. 12, pp. 1720-1737, (2012).

Zhang, Yinqiang et al., "Signal Filtering Method of Silicon Micro-Gyroscope Array", Journal of Southeast University: Natural Science Edition, dated Jun. 30, 2013.

International Search Report and Written Opinion issued in PCT/US2016/051732, dated Dec. 28, 2016; ISA/KR.

* cited by examiner

HIGH-PERFORMANCE INERTIAL MEASUREMENTS USING A REDUNDANT ARRAY OF INEXPENSIVE INERTIAL SENSORS

CROSS REFERENCE TO RELATED APPLICATIONS

This application is a U.S. National Phase Application under 35 U.S.C. 371 of International Application No. PCT/US2016/051732 filed on Sep. 14, 2016 and published in English as WO 2017/048839 A1 on Mar. 23, 2017. This application claims the benefit of U.S. Provisional Application No. 62/218,153 filed Sep. 14, 2015. The entire disclosures of the above applications are incorporated herein by reference.

GOVERNMENT CLAUSE

This invention was made with government support under HR0011-34-1-6400 awarded by DOD/DARPA. The Government has certain rights in the invention.

FIELD

The present disclosure relates to determining rotational rate using a redundant array of inexpensive inertial sensors.

BACKGROUND

The advent of mass-produced microelectrical mechanical systems ("MEMS") gyroscopes has enabled ubiquitous motion sensing in cellular phones and other consumer devices. The low cost and popularity of the MEMS gyroscopes can be attributed to consumer demand and advances in manufacturing technology, which has significantly lowered the price of the sensors.

The MEMS sensors have become highly integrated. It is now common to find three-axis accelerometers and gyroscopes on the same chip in compact surface-mount packages. The gyroscope and accelerometer combination is commonly referred to as an inertial measurement unit (IMU).

MEMS IMUs are commonly used in robotics applications. In aerial robotics, the small size and light weight of the MEMS IMUs are a significant advantage. In ground robots, MEMS IMUs are also often used as the MEMS IMUs provide adequate performance at a low cost. MEMS IMUs are typically used in conjunction with other sensors that measure translational motion to dead-reckon the robot's position and orientation in the absence of external references.

This dead-reckoned orientation estimate is critical for the robot's higher-level systems such as simultaneous localization and mapping ("SLAM"). In one common approach to SLAM, the robot's trajectory is formulated as a pose graph optimization problem with constraints being determined from both inertial estimates and external landmarks. The inertial estimate accumulates error over distance: a heading error of 1° results in 1 meter of displacement error over 60 meters. The optimization problem is nonlinear because of the uncertainty in the robot's orientation, which introduces multiple local minima. Therefore, small improvements in the robot's orientation estimate can have a large effect on the accuracy of the robot's final pose graph.

Improvements in manufacturing have driven down the cost of consumer-grade MEMS gyroscopes. Nonetheless, the costs of high-performance gyroscopes, such as fiber-optic gyroscopes, remain high. High performance gyroscopes MEMS gyroscopes are impractical in certain robotic applications. Though, in general, robot localization systems benefit from more accurate gyroscopes, such is typically out-of-reach because of the associated costs. There are few middle-ground options that are available at a low cost and also provide adequate performance capabilities.

The present disclosure proposes a method that improves the quality of orientation estimates by taking advantage of the availability of low-cost MEMS gyroscopes, namely by fusing the readings of multiple gyroscopes.

This section provides background information related to the present disclosure which is not necessarily prior art.

SUMMARY

This section provides a general summary of the disclosure, and is not a comprehensive disclosure of its full scope or all of its features.

In one form, the present disclosure provides a method for determining the rotational rate of a movable member using an array of inertial sensors. In one aspect, the method includes defining a hidden Markov model ("HMM"). The hidden states of the HMM represent a discrete value measurement of the rotational rate of the moveable member. A transition probability of the HMM accounts for a motion model of the moveable member. An observation probability accounts for noise and bias of at least one of the inertial sensors in the array of inertial sensors. The method also includes receipt, by a processor, of input from the array of inertial sensors. The processor determines the rotational rate of the movable member by solving for an output of the HMM using the input received from the array of inertial sensors.

In some embodiments, the processor may use a forward algorithm to solve the HMM.

In some embodiments, the processor may use a forward-backward algorithm.

In other embodiments, the processor may use a Viterbi algorithm to solve the HMM.

In some embodiments, each inertial sensor of the array of inertial sensors outputs a rotational rate and is coupled to the moveable member.

In some embodiments, wherein the hidden states represent a plurality of angular rates measured at a plurality of timesteps.

In some embodiments, an angular rate of the movable member at a first timestep may be probabilistically conditioned on an angular rate of the movable member at a second timestep.

In some embodiments, the method further includes applying a pre-filter to obtain an approximate of the rotational rate of the movable member, and using the approximate rotational rate to discretize a state space to achieve a reduction in computation time for the HMM.

In some embodiments, the motion model for the movable member is non-linear.

In some embodiments, the motion model has a probability peak at zero velocity and uniform probability elsewhere.

In some embodiments, the motion model is a learned motion model trained form a training set.

In some embodiments, the observation probability is non-linear.

In some embodiments, the method also includes maintaining as a constant a state space size as the number of inertial sensors of the array of inertial sensors increases.

In some embodiments, the observation probability further includes the bias for each inertial sensor of the array of inertial sensors. In such instances, the bias is determined using a filtered angular rate estimate.

In some embodiments, the observation probability further includes an angle random walk modeled as an additive Gaussian white noise process.

In some embodiments, the bias is modeled as a random walk produced by integrating zero-mean Gaussian walk noise.

In some embodiments, the inertial sensors of the array of inertial sensors are non-homogeneous.

In another form, the present disclosure provides an apparatus comprising an array of inertial sensors. In various aspects, the apparatus includes a platform and a movable member. The platform may include a plurality of stacking boards having an array of inertial sensors, and a processor that receives inputs from each inertial sensor of the array of inertial sensors. Each inertial sensor of the array of sensors outputs a rotational rate of the moveable member. The movable member is coupled to the platform and each inertial sensor of the array of inertial sensors. The processor defines a HMM that represents a discrete value measurement of the rotational rate of the movable member. A transition probability of the HMM accounts for a motion model of the moveable member. An observation probability accounts for noise and bias of at least one of the inertial sensors in the array of inertial sensors. The processor determines the rotational rate of the movable member by solving for an output of the HMM suing the input received from the array of inertial sensors.

In some embodiments, the processor uses a forward algorithm to solve the HMM.

In some embodiments, the state space size remains constant as the number of inertial sensors of the array of inertial sensors increases.

In some embodiments, the bias for each inertial sensor of the array of inertial sensors is determined using a filtered angular rate estimate.

In some embodiments, a pre-filter is used to approximate the rotational rate of the movable member. The approximate rotational rate is used to discretize a state space to achieve a reduction in computation time for the HMM.

In some embodiments, the motion model for the movable member is non-linear.

In some embodiments, the inertial sensors of the array of inertial sensors are mounted in multiple planes and orientations.

In some embodiments, the inertial sensors of the array of inertial sensors have different sensitivities and dynamic ranges.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a simplistic exploded view of an exemplary n-gyroscope array.

FIGS. 2A and 2B illustrate a filtering method that functions to reduce state space dimensionality, wherein only a subset of states is viewed as active. FIG. 2A illustrates the full state space. FIG. 2B illustrates the subset (windowed) state space.

Figure 5A:
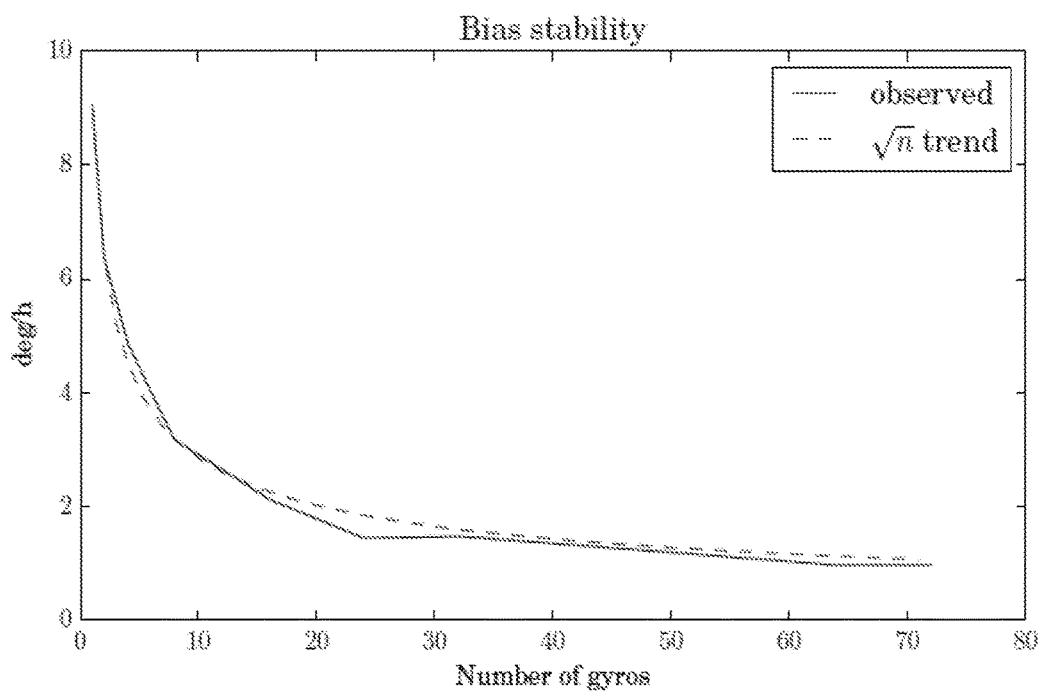
Figure 5B:
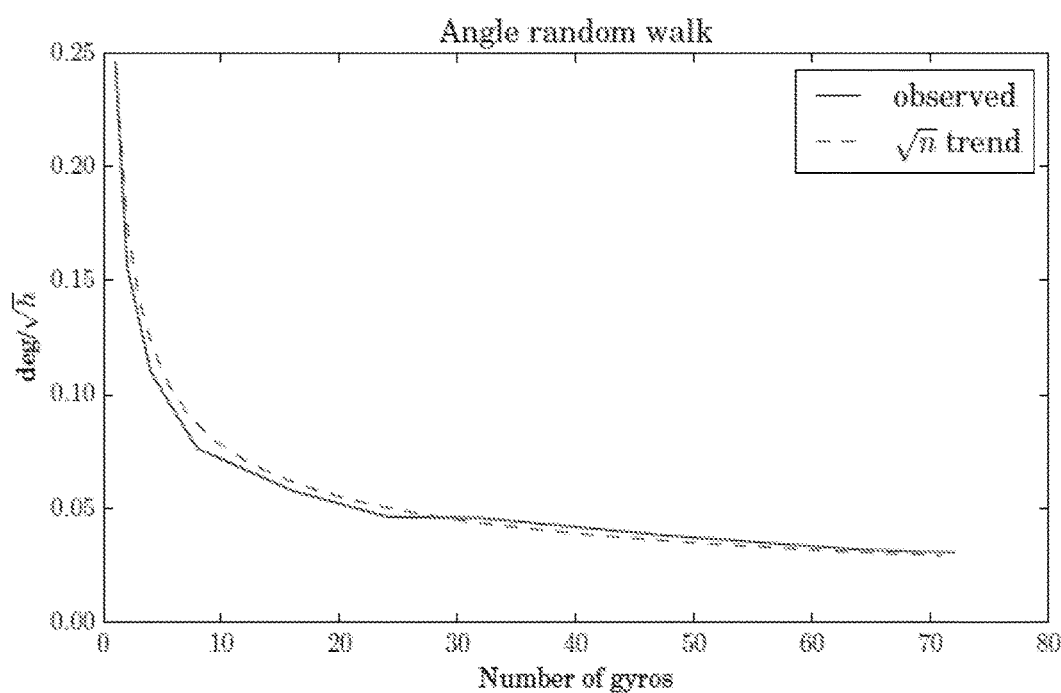

FIGS. 5A and 5B illustrates a comparison of the observed performance of a virtual gyroscope and the predicted performance V. FIG. 5A compares the bias stability of the observed performance of the virtual gyroscope and the predicted performance V. FIG. 5B compares the angular random walk of the observed performance of the virtual gyroscope and the predicted performance $\sqrt{n}$.

Figure 6:
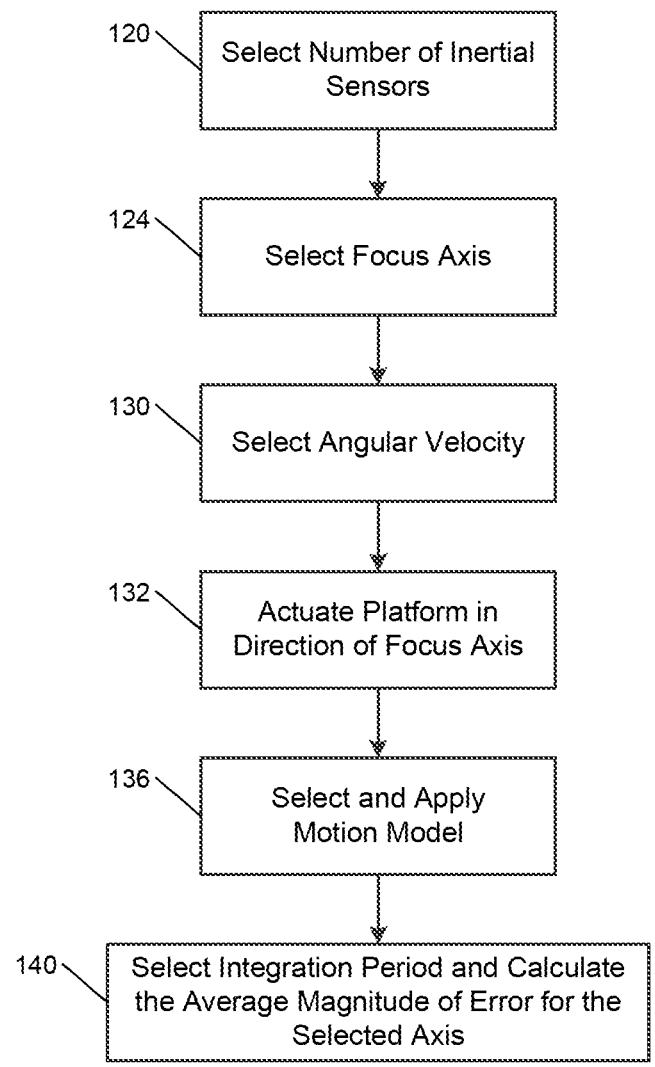

FIG. 6 is a flowchart illustrating a method of optimizing the orientation estimations of a robotics application.

Figure 7A:
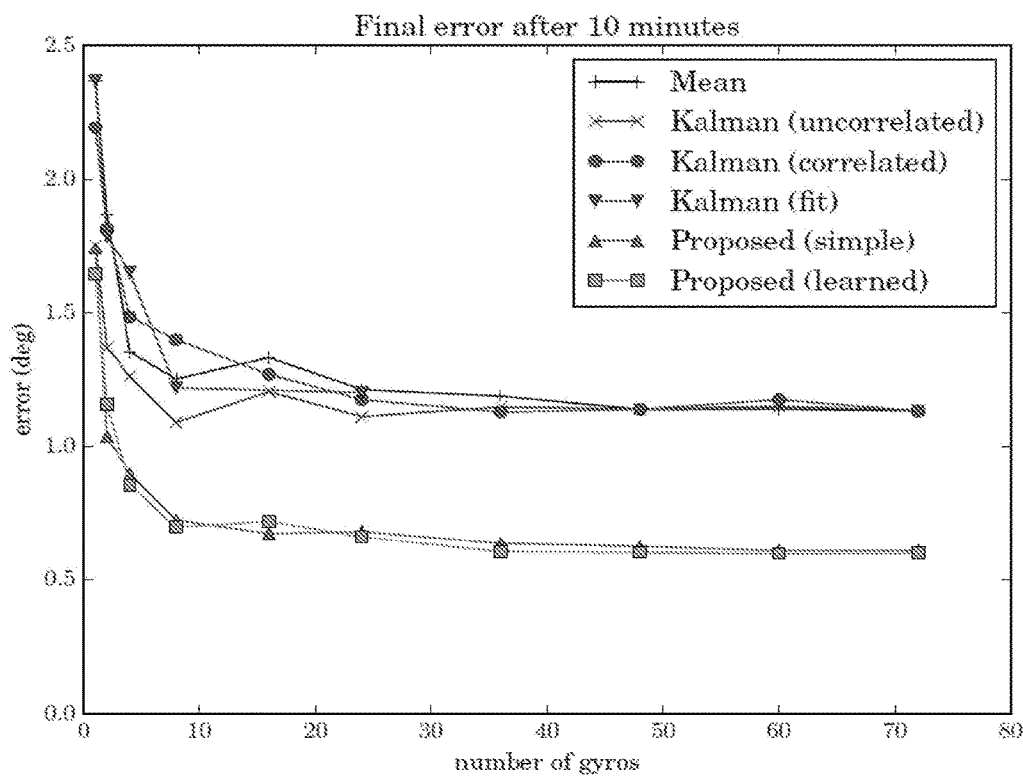
Figure 7B:
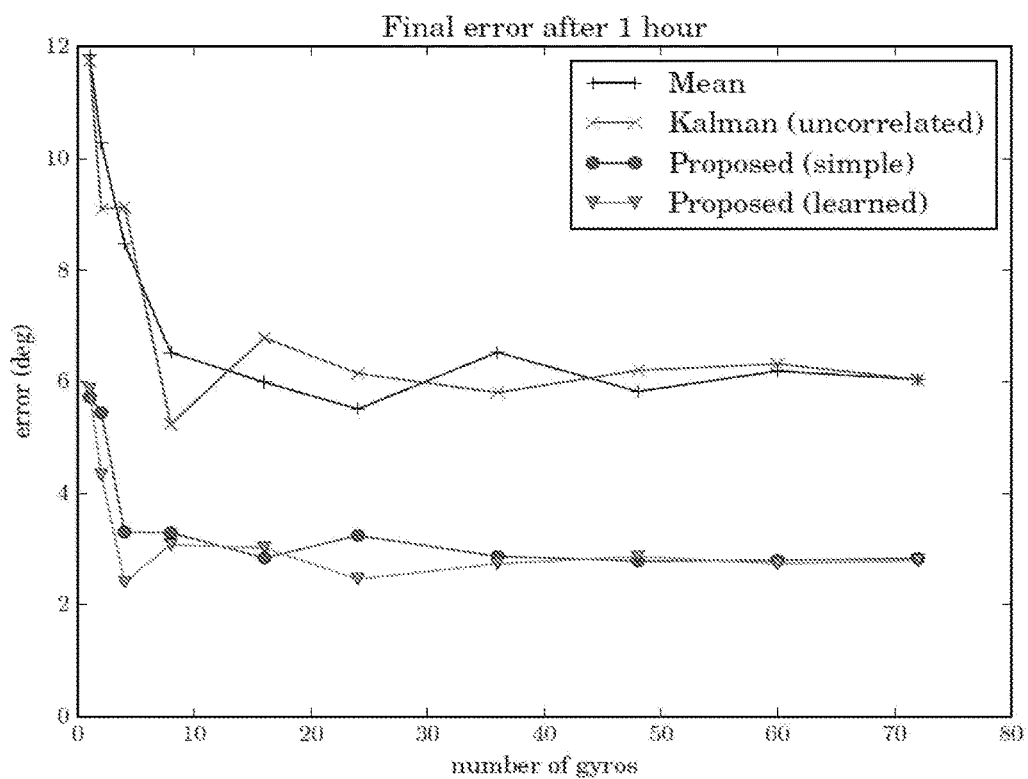

FIGS. 7A and 7B illustrate the average magnitude of error for the selected z-axis accumulated over the integration periods of 10 minutes and 1 hour, respectively. FIG. 7A illustrates the average yaw error after 10 minutes over 100 runs with an error reduction of about 45%. FIG. 7B illustrates the average yaw error after 1 hour and over 20 runs with an error reduction of about 50%.

Figure 8:
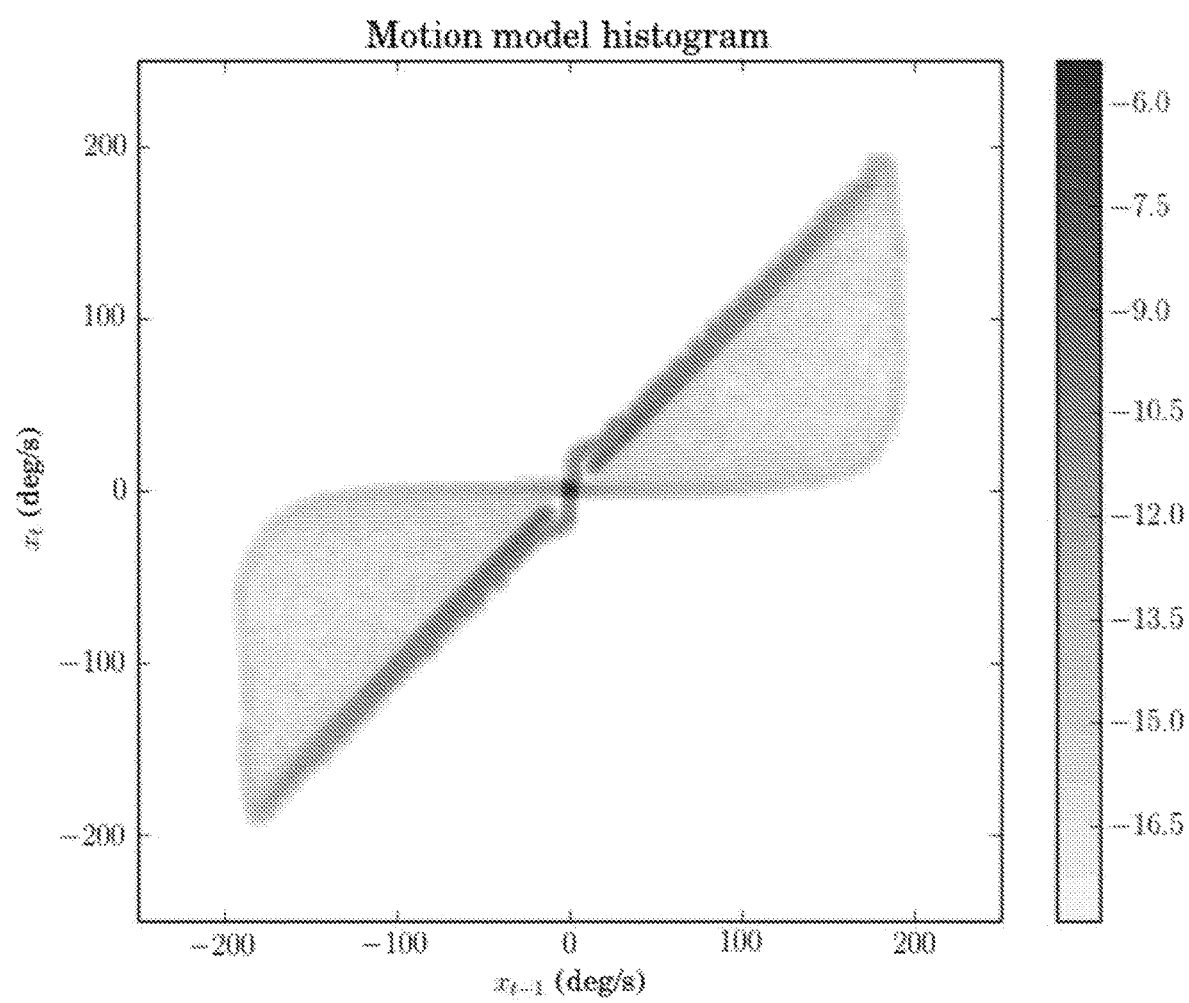

FIG. 8 is a histogram of the motion of the n-inertial sensor illustrating the transition matrix as log $P(x_t|x_{t-1})$.

Corresponding reference numerals indicate corresponding parts throughout the several views of the drawings.

DETAILED DESCRIPTION

Example embodiments will now be described more fully with reference to the accompanying drawings.

A method for determining the rotation rate of a movable member is proposed. In various aspects, the new method proposes using a redundant array of inexpensive inertial sensors to improve the performance of the inexpensive inertial sensors. In particular, the new method proposes using a hidden Markov model ("HMM"), wherein the hidden states of the HMM represent a discrete value measurement of the rotational rate of the movable member. For example, the hidden states may represent a plurality of angular rates measured at a plurality of timesteps. The HMM includes a transition probability that accounts for a motion model of the movable member and an observation probability that accounts for noise and bias of the array of inertial sensors.

Figure 1:
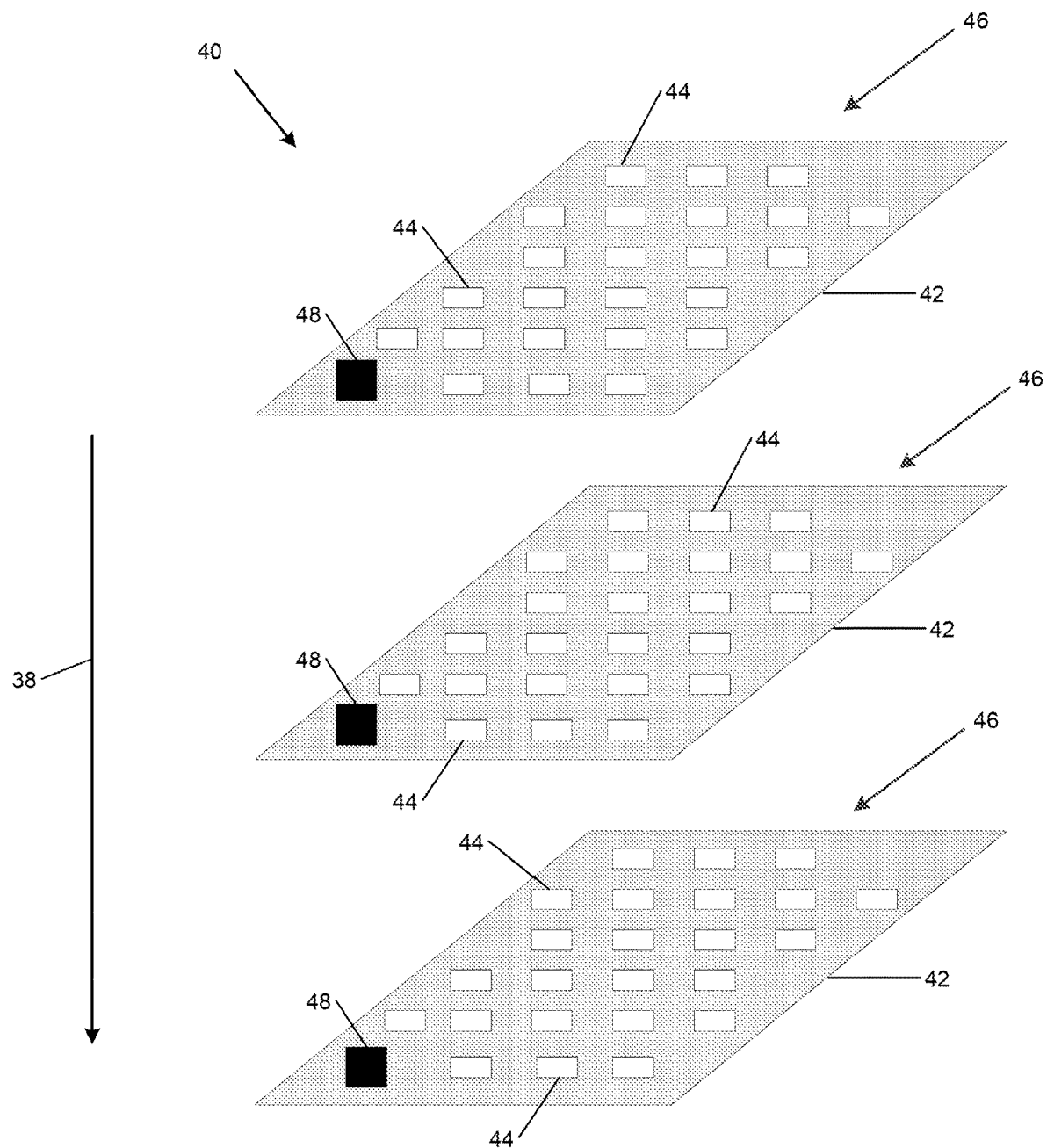

An example of an apparatus is exemplified in FIG. 1. With reference to FIG. 1, an exploded view of a platform 40 comprising a plurality of stacking boards 42 including an array of inertial sensors 46 is depicted. The arrow 38 indicates the direction of movement of the plurality of stacking boards 42 to form the platform 40. Although use of a platform 40 comprising a plurality of stacking boards 42 having the array of inertial sensors 46 is described herein, it is understood that in certain instances, the platform may not include any stacking boards.

Furthermore, the inertial sensors 44 may be rigidly mounted on the platform. The inertial sensors 44 of the array of inertial sensors 46 may be mounted in different orientations and in multiple planes with respect to each other. The inertial sensors 44 of the array of inertial sensors 46 may be non-homogenous, with differing sensitivities and dynamic ranges. The inertial sensors 44 of the array of inertial sensors 46 may be made by different manufacturers. Use of inertial sensors 44 manufactured by different manufacturers allow the different error characteristics of each to be exploited. The inertial sensors 44 of the array of inertial sensors 46 may be manufactured as an integrated MEMS or as an integrated package. Each inertial sensor 44 of the array of inertial sensors 46 may include a 3-axis gyroscope, a 3-axis accelerometer, and a temperature sensor. For example only, the platform 40 may comprise 3 stacking boards, and 72 Invensense MPU-6000 IMUs, wherein each stacking board 42 has 24 IMUs.

The platform 40 further comprises a processor 48. The processor 48 may be onboard, external, or at other locations with respect to the platform. By way of non-limiting example, there may be a processor 48 on each of the stacking boards 42. Furthermore, the processors 48 on each of the stacking boards 42 may transmit data to a single processor (not shown) that is onboard or external. For example only, the processor(s) 48 may be a microcontroller. The platform 40 may further comprises a plurality of analog-to-digital converters ("ADCs") (not shown) deposed at each sensor channel. Each ADCs may produce a digital output with 16 bits of resolution. For example, the single processor may integrate the data submitted by the individual processors 48, which receives data from each of the inertial sensors 44 of the array of inertial sensors 46. The submitted data may be read at 1 kHz, the maximum output rate of the inertial sensors 44. The single processor may log the integrated measurements at 100 Hz.

The platform 40 may further comprise other components or elements, including resistors, capacitors, crystal oscillators, transceivers for transmitting sensor data, and other components or elements.

The present method of use of the described apparatus involves posing the inertial sensors filtering problem (e.g., reduce bias drift) as a hidden Markov model ("HMM"). Generically, a HMM is a statistical model in which the system is a memoryless process with hidden states. In the present instance, the hidden variables (states) $x_t$ represent a discrete value measurement of the rotational rate of the moveable member. The hidden variables may represent a plurality of angular rates measured at a plurality of timesteps. The HMM includes a transition probability that accounts for a motion model of the movable member and an observation probability that accounts for noise and bias of at least one of the inertial sensors of the array of inertial sensors, e.g., an observation vector $z_t$ corrupted with noise and biases for each observation over time.

Although use of a forward algorithm is described herein, it is understood that a forward-backwards algorithm, a Viterbi algorithm, or other algorithms may be used to solve the HMM in certain instances. The forward algorithm computes a posterior distribution $P(x_t|z_{1:t})$ over the current state given the sequence of observations $z_{1:t}$. Application of the Markov property, provides that $x_{t+1}$ is conditionally independent of $x_{1:t-1}$ given the current state $x_t$. Therefore, the probability distribution is recursively updated at each timestep, resulting in the marginalization of the previous state:

$$P(x_{t+1}|z_{1:t+1}) = P(z_{t+1}|x_{t+1}) \Sigma_{x_t} P(x_t|z_{1:t}) P(x_{t+1}|x_t) \quad (1)$$

$P(z_{t+1}|x_{t+1})$ is an emission or observation probability. $P(x_t|z_{1:t})$ is the posterior distribution at the previous timestep. $P(x_{t+1}|x_t)$ is a transition probability derived from a motion model. The maximum likelihood is estimated by taking:

$$\hat{x}_t = \underset{x_t}{\mathrm{argmax}} P(x_t|z_{0:t}) \quad (2)$$

To use the forward algorithm to solve the HMM, a state space of possible angular rates is discretized. In certain instances, to reduce quantization error, the state space is discretized at a resolution of $$\frac{1}{512}°/s$$

per least significant bit ("LSB"), which effectively provides 3 bits of increased resolution compared to the raw 16-bit readings from our gyros.

Figure 2A:
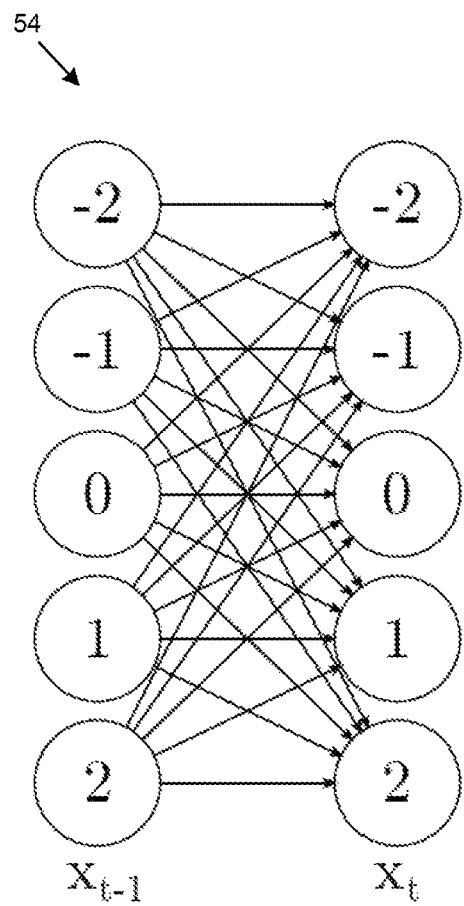
Figure 2B:
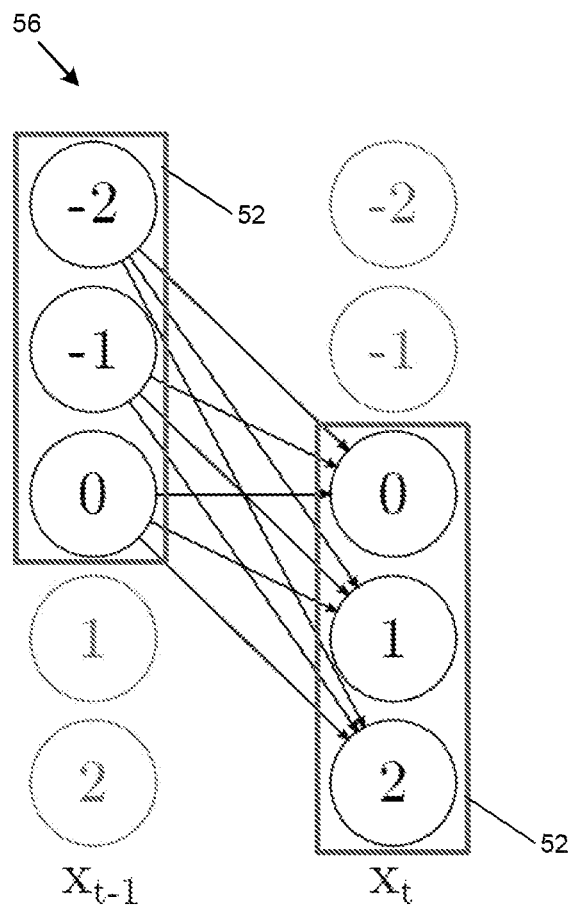

The computation time of the forward algorithm increases with the square of the number of states. Therefore, an approximately filtering method may be used in certain instances to reduce the computation time of the forward algorithm. As illustrated by FIG. 2A and FIG. 2B, the approximately filtering method treats only a designated window 52 of states as active for each timestep. FIG. 2A illustrates the full state space 54, while FIG. 2B illustrates the windowed state space 56. For example, it is impractical to store and compute updates for $2^{19}$ states. Therefore, the approximately filtering method is applied and only a window of 128 states is treated as active for each timestep. In such an instance, updates are computed for the window of 128 states and not for all $2^{19}$ states. The size of the designated window can be enlarged, but at the expense of additional computation time.

The center of the designated window is determined at each timestep by a pre-filter. The pre-filter angular velocity may be estimated using the average of all the inertial sensors readings at the particular timestep. In certain instances, the pre-filter estimates the angular velocity within $$\pm \frac{1}{8}°/s.$$

The observation probability $P(z_{t+1}|x_{t+1})$ accounts for noise and bias of at least one of the inertial sensors of the array of inertial sensors. Two categories of noise and bias are angular random walk accounting for zero-mean white noise $v(t)$ and rate random walk account for the angular rate $\omega(t)$. The angular random walk is modeled as additive Gaussian white noise with standard deviation $\sigma_n$. In a noise-only model the probability of an observation $z_t$ is as follows:

$$P(z_t|x_t) \propto \exp\left(-\frac{(z_t - x_t)^2}{2\sigma_n^2}\right) \quad (3)$$

The biases for each inertial sensors n within the system having an array of inertial sensors is implicitly determined by the filtered angular rate estimate by: $b_1(t) = z_n(t) - \omega(t)$, wherein $b(t)$ represents the bias, $\omega(t)$ represents the angular rate, and $z_n$ is the observed angular rate. The biases are not explicitly estimated, and therefore, the size of the state space remains constant as the number of inertial sensors increases. Maintaining the size of the state space as a constant is important in systems including large arrays of gyros.

Bias is not included as a state vector, but may be modeled by adding an additional term to the observation model that penalizes angular rate ω choices that cause large bias changes. In such instances, the bias estimates for each inertial sensor is filtered to remove angular random walk.

Then the derivative of the bias b(t) is numerically estimated. In an example embodiment, bias is modeled as a Gaussian random walk with standard deviation $\sigma_b$:

$$P(z_t | x_t) \propto \exp\left(-\frac{(z_t - x_t - b_{t-1})^2}{2\sigma_n^2}\right) \exp\left(-\frac{b_t^2}{2\sigma_b^2}\right) \quad (4)$$

However, non-Gaussian distributions for b(t) may be appropriate in other instances.

The transition probability $P(x_t|x_{t-1})$ accounts for a motion model of the movable member. Use of the forward algorithm to estimate the hidden state or variables $x_t$ allows for the use of a non-linear system model, which is a discrete-time HMM. The observation probability may also be non-linear. In an uninformative motion model, bias drift is unobservable because it is indistinguishable from an actual angular rate signal. A motion model is an applied filter that assigns greater probability to either interpretation of the signal. The motion model determines the probability whether the signal represents drift or true motion. In certain aspects, there is no need for explicit estimation of a stopped condition. The motion model is dependent on the system and as such it is understood that there are no generally required variables. It is our understanding that any model of the system's motion can be used to improve filter performance. For example only, in certain embodiments, a simple motion model inspired by the zero-velocity update may be used. In other instances, a learned motion model based on actual motion data may be used.

Figure 3:
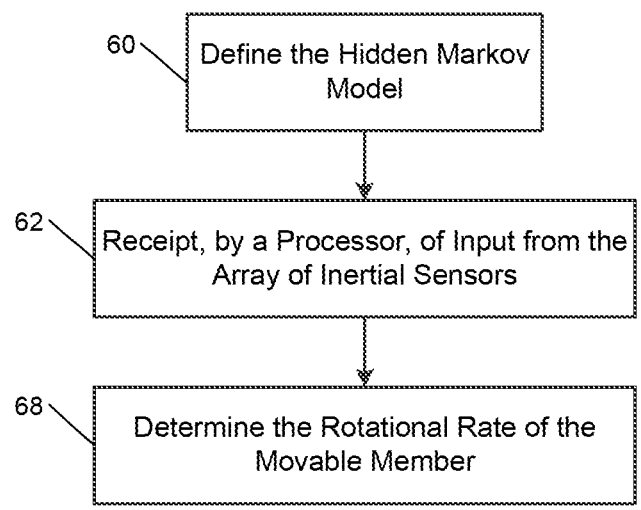
FIG. 3 is a flowchart illustrating a method for determining the rotational rate of a movable member using the array of inertial sensors.

With reference to FIG. 3, the described method for determining the rotational rate of a movable member using the array of inertial sensors is illustrated. The movable member is coupled to the array of inertial sensors. First, as seen at 60, the HMM is defined. As detailed above, the HMM represents a discrete value measurement of the rotational rate of the moveable member and includes a transition probability and an observation probability. To define the HMM, the motion model is selected and the transition model is defined. The motion model accounts for the motion of the movable member and defines the rotational rate of the movable member in terms of one or more probability measures. As noted above, it is our understanding that any model of the system's motion can be used, and the motion model may be linear or non-linear. To define the HMM, a noise and bias model may be selected to define the observation probability.

At 62, after the HMM is defined, the processor receives input from the array of inertial sensors 46. In certain instances, each inertial sensor 44 of the array of inertial sensors 46 outputs a rotational rate and is coupled to the movable member. At 68, the rotational rate of the movable member is determined by the processor. The processor solves for an output (e.g, posterior distribution) of the HMM using the input received from the array of inertial sensors. As noted above, a forward algorithm, a forward-backwards algorithm, a Viterbi algorithm, or another algorithm may be used to solve the HMM. In some embodiments, the motion of the movable member is controlled using the calculated rotational rate of the movable member.

Figure 4:
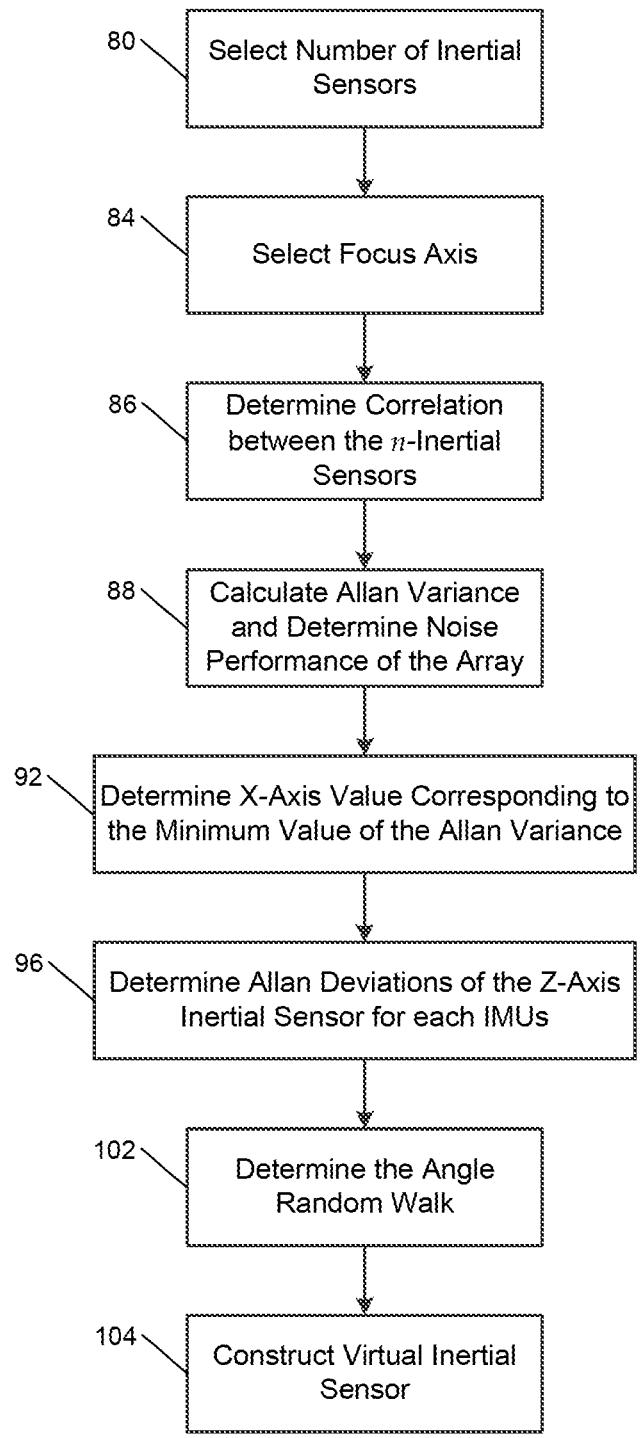
FIG. 4 is a flowchart illustrating a method of determining the noise performance of the n-gyroscope array.

Other aspects of the proposed method are exemplified in FIG. 4. With reference to FIG. 4, a method for determining the noise performance of the n– inertial sensors array is illustrated. First, as seen at 80, a select multiple of inertial sensors n are fused, for example, as illustrated in FIG. 1. All sensor data available will be utilized. By way of non-limiting example, the array may include 72 Invensense MPU-6000 IMUs, n=72. After the multiple of inertial sensors is selected, a focus axis is selected at 84. The focus axis is selected from the z-axis (yaw angle), the x-axis (roll angle), or the y-axis (pitch angle). For example, the inertial sensors performance the z-axis may be analyzed. The z-axis may be selected because the roll angle and the pitch angles can be independently observed using the onboard accelerometers to observe a gravity vector. The yaw angle is not observable by onboard sensors. However, it is understood that the present approached may be applied to pitch and roll angles.

Correlations between the inertial sensors are analyzed at 86. For example only, the analysis performed may be a cross-correlation analysis between the signals of the inertial sensors. For example, there may be three stacking boards 42, each including 24 IMUs and there are 72 total IMUs. In such instances, the analysis is completed over a single stacking board. The analysis over the 24 IMUs on the selected stacking board demonstrates a block pattern correlation of the z-axis inertial sensors. There are three blocks of IMUs: a first block having 8 IMUs, a second block having 8 IMUs, and a third block having 8 IMUs. In such instances, the IMUs of the second block are negatively correlated with the IMUs of the first and third blocks. While the IMUs of the first and the third blocks are slightly positively correlated. It is our understanding that the evidenced correlation arise from the physical layout of the staking board. The IMUs of the second block are rotated 90 degrees in the z-axis relative to the IMUs of the first and third blocks. In both instances, the magnitudes of the positive and negative correlations are minuscule.

An Allan variance is calculated at 88. The Allan variance is a widely-accepted statistical method to characterize the noise of an inertial sensor. The Allan variance expresses the variance of a signal as a function of a time window over which the signal is averaged. Over small timescales, the angular random walk dominates the noise. As the averaging time window increases, the Allan variance decreases because of a reduction of angular random walk noise. The downward trend, however, does not continue indefinitely because the Allan variance also increases as a result of rate random walk. A minimum value of Allan variance at the inflection point between the reduction associated with angular random walk noise and the increase associated with rate random walk noise is commonly referred to as a bias stability of the inertial sensor. The minimum value of the Allan variance is understood to be the optimistic lower bound that references the speed at which angular error accumulates, assuming the longest possible averaging window. However, in certain instances the averaging window may be impractical because it also filters out the dynamics of the system.

At 92, a x-axis value corresponding to the minimum value of the Allan variance is determined. The x-axis corresponding to the minimum Allan value is the time window that minimizes the variance of the signal and is used as an averaging period of initial bias calibration. After the minimum value of the Allan variance is reached, the superlinear-growth error of the rate random walk overruns the sublinear growth error of the angular random walk.

At 96, Allan deviations of the z-axis inertial sensors of each of the IMUs are determined. The Allan deviation is the square root of the Allan variance. At 102, the angular random walk is determined. The angular random walk is the value of the Allan deviation at τ=1 second, where τ is the averaging time window of the Allan variance plot. The angular random walk represents the standard deviation of the angle in degrees per square root. In the present example where n=72, the average angular random walk is 0.23°/√hr with a bias stability of 5.8°/hr occurring between 10 and 100 seconds.

At 104, a virtual inertial sensor is constructed by averaging the n-inertial sensors. The application of additional filters is not needed because of the little to none correlation existing between the inertial sensors, as seen at 86. As seen in FIGS. 5A and 5B, the virtual inertial sensor matches a predicted √n decrease in noise, which confirms that the present inertial sensors are not strongly correlated positively or negatively. Specifically, FIG. 5A depicts the bias stability, while FIG. 5B depicts the angular random walk. In both instances, the observed is significantly similar to the predicted √n.

Other aspects of the proposed method are exemplified in FIG. 6. With reference to FIG. 6, a method of determining and optimizing the orientation estimations of a robotics application is illustrated. First, as seen at 120, a select multiple of inertial sensors n are fused, for example as illustrated in FIG. 1. The array may include 72 Invensense MPU-6000 IMUs, n=72 and a servo-actuated platform may be used. The IMUs are mounted on the platform 40. After the multiple of inertial sensors is selected, a focus axis is selected at 124. For example, the inertial sensor performance on the z-axis may be analyzed.

After the focus axis is selected, an angular velocity is uniformly and randomly selected at 130. The platform 40 is actuated in the direction of the chosen axis at 132. In some embodiments, the platform may be actuated by a Dynamixel digital servo. In such instances, feedback of the Dynamixel digital servo is logged as ground truth for evaluation. In particular, the platform may be actuated in the yaw direction by a Dynamixel digital servo. The platform is actuated and rotated back and forth 180 degrees. The speed of the platform increases uniformly until the selected angular velocity is achieved. Conversely, the speed of the platform decreases at the fastest rate possible to achieve the selected angular velocity (see FIG. 8).

At 136, a motion model is selected and applied. The motion model determines the probability of whether a signal represents bias drift or true motion. In some instances, a learned motion model may be applied. The learned motion model is trained from the ground truth of the servo of a separate training set. The separate training set comprises data collected on a separate run of the system. In other instances, a simple motion model may be applied. The simple motion model encodes that the system is more likely to be still than moving, with a probability peak at zero velocity and uniform probability elsewhere. γ is the normalization factor that makes the probabilities sum to 1.

$$P(x_t \mid x_{t-1}) = \begin{cases} 10/\gamma & \text{if } x_t = 0 \text{ and } x_{t-1} = 0 \\ 1/\gamma & \text{otherwise} \end{cases}$$

At 140, the average magnitude of error is calculated over a selected integration period. For example, only the selected integration periods may be at 10 minutes and 1 hour. In the present instance, because the inertial sensor performance on the z-axis is analyzed, the average magnitude of yaw error accumulated over the integration periods of 10 minutes and 1 hour is calculated.

FIGS. 7A and 7B illustrate the average magnitude of error for the selected z-axis accumulated over the integration periods of 10 minutes and 1 hour, respectively, as described with reference to 140 of FIG. 6. In FIG. 7A and FIG. 7B, the degree of error is plot against the multiple of inertial sensors n.

FIG. 7A depicts the average yaw error after 10 minutes over 100 runs. Specifically, FIG. 7A illustrates that application of a Kalman filter with uninformative motion models performs similarly to the averaging filter. FIG. 7A also visualizes the reduction in error that results from application of the present method. In certain instances, a 45% reduction in the error is seen. Furthermore, FIG. 7A shows that there is no measurable performance gain from application of a learned motion model as compared to the simple motion model.

FIG. 7B depicts the average yaw error after 1 hour and over 20 runs. FIG. 7B visualizes the reduction in error that results from application of the present method. In certain instances, a 50% reduction in the error is seen.

FIG. 8 illustrates the constant acceleration and rapid deceleration, described with reference to 132 of FIG. 6, in the form of a motion histogram. The histogram depicted in FIG. 8 depicts the transition matrix as log $P(x_t \mid x_{t-1})$, which refers to the log probability that the angular velocity is $x_t$ with respect to a previous angular velocity $x_{t-1}$. The motion histogram uses the ground truth of the servo and is regulated with a Gaussian kernal around each sample point.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for determining rotational rate of a movable member using an array of inertial sensors, the method comprising:
    defining a hidden Markov model ("HMM"), wherein hidden states of the HMM represent a discrete value measurement of the rotational rate of the movable member, and transition probability of the HHM accounts for a motion model of the movable member, and observation probability accounts for noise and bias of at least one of the inertial sensors in the array of inertial sensors;
    receiving, by a processor, input from the array of inertial sensors;
    determining, by the processor, the rotational rate of the movable member by solving for an output of the HMM using the input received from the array of inertial sensors; and
    controlling, by the processor, motion of the movable member using the rotational rate of the movable member.

2. The method of claim 1, wherein the hidden states represent a plurality of angular rates measured at a plurality of time steps.

3. The method of claim 1, further comprising:
    applying a pre-filter to obtain an approximate of the rotational rate of the movable member; and
    using the approximate rotational rate to discretize a state space.

4. The method of claim 1, further comprising:
    maintaining as a constant a state space size as the number of inertial sensors of the array of inertial sensors increases.

5. An apparatus comprising:
    a platform, wherein the platform comprises
        an array of inertial sensors coupled to the platform, and
        a processor coupled to the platform that receives inputs from each inertial sensors of the array of inertial sensors; and
    a movable member coupled to the platform, wherein
        each inertial sensor of the array of sensors outputs a rotational rate of the movable member,
        the processor defines a hidden Markov model ("HMM"), wherein hidden states of the HMM represent a discrete value measurement of the rotational rate of the movable member, and transition probability of the HHM accounts for a motion model of the movable member, and observation probability accounts for noise and bias of at least one of the inertial sensor in the array of inertial sensors; and
        the processor determines the rotational rate of the movable member by solving for an output of the HMM using the input received from the array of inertial sensors, and controlling motion of the movable member using the rotational rate of the movable member.

6. The apparatus of claim 5, wherein a state space size is constant as the number of inertial sensors of the array of inertial sensors increases.

7. The apparatus of claim 5, wherein a pre-filter is used to approximate the rotational rate of the movable member, and the approximate rotational rate is used to discretize a state space.

8. An apparatus comprising:
    a platform, wherein the platform comprises
        an array of inertial sensors coupled to the platform, and
        a processor coupled to the platform that receives inputs from each inertial sensors of the array of inertial sensors; and
    a movable member coupled to the platform, wherein
        each inertial sensor of the array of sensors outputs a rotational rate of the movable member,
        the processor defines a hidden Markov model ("HMM"), wherein hidden states of the HMM represent a discrete value measurement of the rotational rate of the movable member, and transition probability of the HHM accounts for a motion model of the movable member, and observation probability accounts for noise and bias of at least one of the inertial sensor in the array of inertial sensors; and
        the processor determines the rotational rate of the movable member by solving for an output of the HMM using the input received from the array of inertial sensors.

* * * * *